June 14, 1955        W. GEHRIG        2,710,480
FISHING DEVICE
Filed March 28, 1949        2 Sheets-Sheet 1
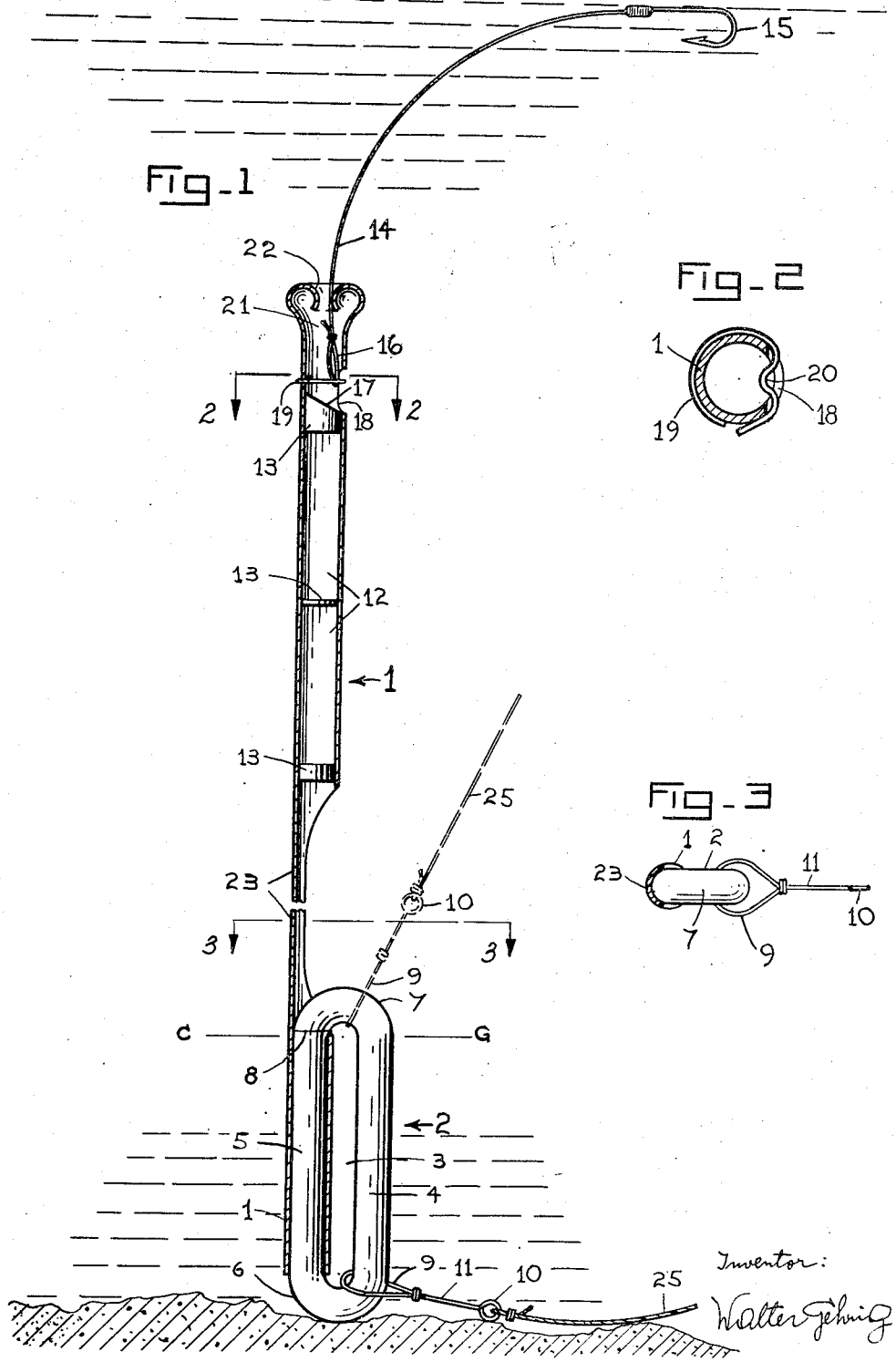
Inventor:
Walter Gehrig June 14, 1955  W. GEHRIG  2,710,480
FISHING DEVICE
Filed March 28, 1949  2 Sheets-Sheet 2

INVENTOR.
Walter Gehrig

United States Patent Office 2,710,480
Patented June 14, 1955

2,710,480

FISHING DEVICE

Walter Gehrig, Flint, Mich.

Application March 28, 1949, Serial No. 83,859

17 Claims. (Cl. 43—43.15)

The present invention relates to fishing tackle and the aim is to provide an improved combined casting weight, sinker and bait raiser for fishing with a baited hook and line.

The primary object of the invention is the provision of a bait sinker which holds the bait a predetermined distance above the bottom of a lake or river. The device comprises a buoyant body secured to a sinker body, the total weight of both being heavier than water. Attaching means are provided to hold a hook-leader in a bellmouthed passageway on the top end of the buoyant body. The result is that the described sinker unit will stand substantially upright on the bottom of a lake and hold the baited hook above stones and short weeds where fish can see the bait. This also prevents live bait from crawling under stones or weeds and generally displays the bait is a nature like manner resembling a creature, such as an insect or minnow, nibbling on the end of a weed stalk. The combined sinker and bait raiser is especially advantageous when fishing close to the bottom in deep water as the hook can be reeled in to within a short distance of the rod tip without any interference by parts on the line, as would be the case if a float on the surface of the water would be used to hold the bait at the same depth.

Another object of the invention is the provision of means to raise the bait off the bottom of a lake or river but anchor it to the bottom to prevent drifting.

A further object of the invention is to provide a combined castingweight, sinker and bait raiser which makes it easy to cast a baited hook and leader a considerable distance with a conventional casting rod and reel.

Another object of the invention is to provide simple and neat assembling means for the hook-leader, sinker unit and fishing line, the leader-loop being enclosed in a longitudinal passage-way to prevent the hook from getting entangled thereon. The emerging leader portion thus is also held in an upright position.

A further object of the invention is to reduce the causes of leader breakage by provision of means preventing repeated bending of the leader at the point adjacent to the comparatively stiff leader knot and leader-loop. I attain this by inserting and securing the leader loop in the above said passageway and by enlarging the upper end thereof into a curved bellmouthed bending form for the leader to bend over.

Another object of the invention is to provide a combined casting weight, sinker and bait raiser which travels like a dart, always head first, during the cast, while diving into the water and when retrieved.

A further object of the invention is to provide a sinker unit which drops into the water without a big splash or loud noise and when retrieved travels past weeds and other obstructions without tending to get entangled thereon.

The combined sinker and bait raiser can be designed in varied lengths and forms to suit different fishing grounds and various fishing methods.

With these and other objects in view, the invention consists in features of construction, combinations and arrangement of parts as will be hereinafter more fully described in detail, illustrated in the accompanying drawing which discloses the preferred embodiments of the invention, and pointed out in the claims hereunto appended.

Figure 1 illustrates a combined casting weight sinker and bait raiser comprising a rigid raiser-body in the form of a plastic tube having air chambers therein. The tube being shown in longitudinal mid-section.

Figure 2 shows a leader retainer on said tube, the tube being shown in enlarged cross-section taken through Figure 1 as shown by line and arrows 2—2.

Figure 3 is a cross sectional view through said tube and top view of a sinker taken as shown by the line and arrows 3—3 in Figure 1.

Figure 4:
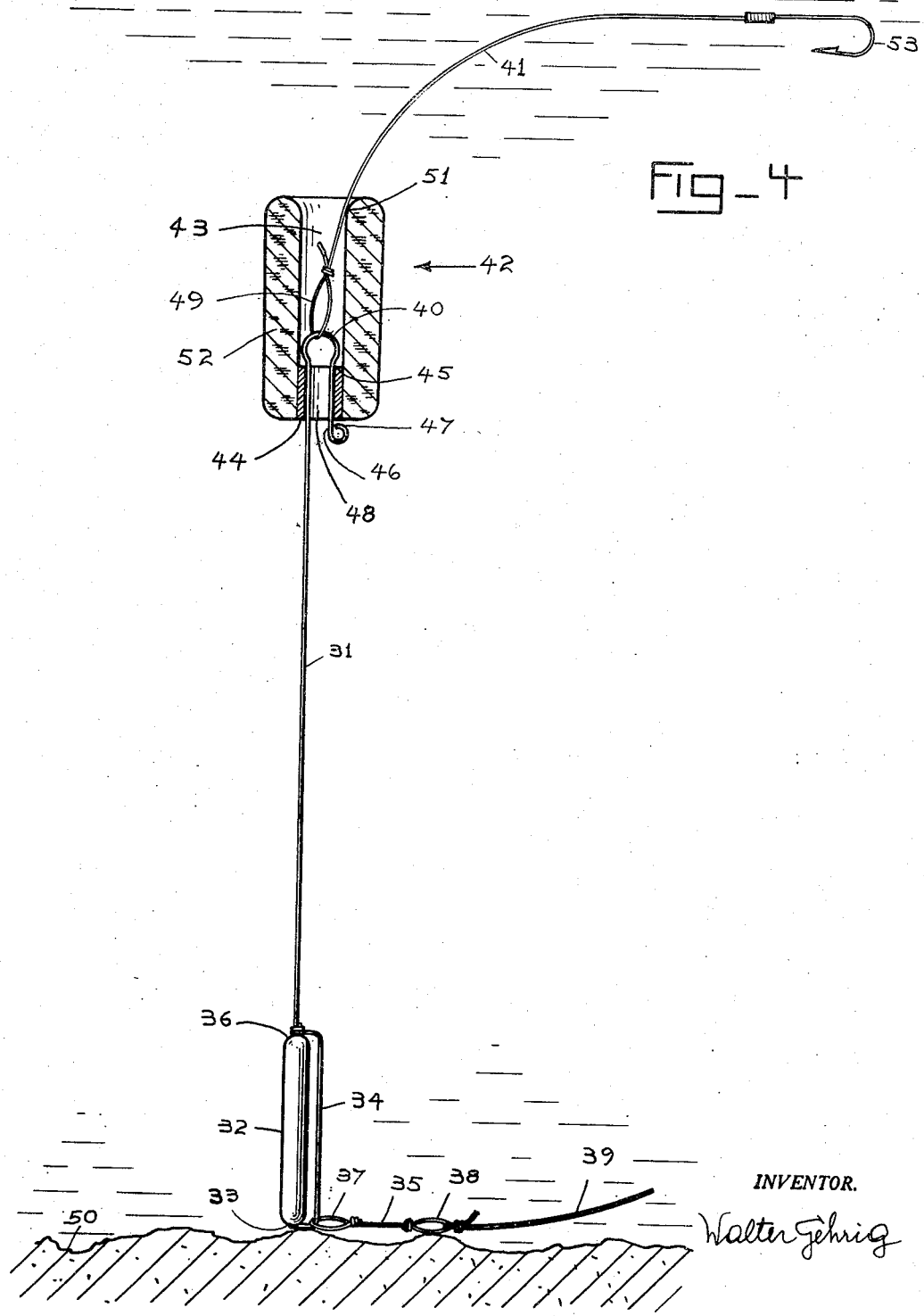
Figure 4 is a modified form of the same invention. A buoyant tubular member on the top end of the assembly body is shown in longitudinal mid-section in this figure.

In Figure 1 of the drawing the numeral 1 indicates a rigid raiser-body in the form of a tube, preferably of green or transparent plastic. A sinker 2 having a section forming a return bend circumscribes an aperture 3. The sinker 2 consists of a metal rod fitting the inside of the tube 1 and having two longitudinal substantially long portions 4, 5 connected by transversely bent portions 6, 7. The numeral 8 indicates the rod joint.

The middle portion of the tube 1 has a cut-away part as shown in Figure 1 and the upper bent portion 7 enters the lower tube portion and projects therein to contact the rod portion 5 embraced by the lower tube portion. A movable member 9 having line attaching means 10 formed at one end thereof is slidably and pivotally mounted in said aperture 3 and embraces a portion 4 of a sinker 2. It consists of a wire-link 11 having eyelets 9, 10, respectively, at the ends thereof. The upper end of the aperture 3 and the upper bent portion 7 are located adjacent a line which extends through the center of gravity of the described assembly, indicated in the drawing by line C—G (center-gravity).

The upper tube portion has air chambers 12 inclosed therein by spaced partition-seals 13 consisting of cork plugs, plastic discs or other suitable material. The buoyancy of the air chambers is adequate to hold the tube 1 in upright position above the sinker resting on the bottom of a body of still water.

The upper end portion of the tube 1 forms a combined passageway enclosure, retainer and bending form for the connective end of a flexible wiry hook-leader 14 having a fish-hook 15 on one end and a leader-loop on the other end thereof. A transverse inclined leader deflecting face 17 is provided on the outer end of the uppermost partition-seal 13 and slants downward in the direction of an aperture 18 formed throught the tube-wall forming the passageway and leader enclosure. A leader retaining member 19 in the form of a split-ring embraces the tube 1 and has a return-bend 20 extending into and across said aperture 18. A hook leader 14 can be secured in the tubular leader enclosure 21 to the leader retaining member 19 by manually pushing the leader-loop down through the leader passageway and enclosure against the slanted leader deflecting face 17, the tip of the leader-loop will be deflected and slide along the deflection face in the direction of the aperture until stopped by the edges of the aperture 18. The fisherman can now easily get hold of the protruding tip of the leader-loop on the outside of the tube 1 and hook the same on the return bend 20 of the leader retainer as shown in Figure 1. The upper end portion of said leader enclosure 21 opens in an arc of a comparatively large radius to form a bending form 22 for the emerging adjacent portion of the leader to bend over.

The middle portion of the tube 1 has an optional cut-away portion leaving only a ribbon 23 having an inherent resiliency. This ribbon can be manually bent and when free tends to return and keep the ribbon in generally straight and rigid form. The ribbon 23 and the tube portions on each end thereof thus form a generally straight manually flexible but inherently stiff body of comparatively long and narrow proportion, spacing the emerging leader portion 14 from the opposite end of the sinker 2 at a predetermined distance determined by the free length of said body. The top end of the body and leader enclosure forms a directional leader support. The buoyant means embodied in the body at a point spaced from the sinker cooperates with the leader support to direct the emerging leader portion upward.

Operation

When the described assembly is swung in an arc on the tip of a casting rod (not shown), as during a back cast, the air-drag of the comparatively light end portion 12—21, leader 14 and baited hook 15 will cause the buoyant end 12 to trail the sinker 2 and the movable member 9 consequently will locate itself on the leading end 6 of the guide 4 and slot 3. At the end of the back cast and start into the forward cast, the reversed line-pull will cause the assembly to perform a fast longitudinal direction reversal and also a half roll about its longitude. During this fast position reversal the trailing leader 14 is bent over the curved bending form 22 provided therefor. It is well known that repeated bending and twisting of a flexible leader causes the same to weaken at the point adjacent the leader knot and comparatively stiff leader loop. In the described invention the leader bends in a moderate and even curve at a location some distance away from the knot, thus substantially eliminating a cause of leader breakage.

During the forward cast, as long as the line 25 is pulling the described assembly, the movable member 9 will pull the rest of the assembly at the front end of the slot 3 and guide 4, but the movable member 9 will slide to the back end of the slot 3 and guide 4 as soon as the device starts to pull the casting line 25 through the air and off the reel. In this back position of the movable member 9 the line drag is in the general direction of the assemblies center of gravity and the assembly therefore is free to "weather-vane" about the pivotally mounted movable member 9. In the drawing the general direction of line drag during a cast is indicated by the dotted outline of the wire link 11 and the center of gravity is indicated by the dotted line C—G. The assembly travels through the air in an arc like a dart or arrow, sinker first with the buoyant body, leader and hook trailing last. The wire link 11 will pivot about its pivotal connection adjacent the center of gravity of the assembly to adjust itself in the direction of the line drag. The assembly in flight maintains a longitudinal position in line with its direction of travel and at the end of the cast will dive into the water sinker first. A slack casting line lets the sinker assembly sink to the bottom of the lake where it will stand in upright position as illustrated in Fig. 1 due to the buoyant means 12 lifting the upper end thereof. The leader 14 being retained in the passageway and leader retainer 21 in an upright position minimizes entanglement of the hook 15 as the wiry leader 14 bends in an arc away from the assembly at rest on the bottom of a body of water. The baited hook is therefore held off the ground and above shorter weeds where fish can see it. When the slack casting line 25 is reeled back in, then the movable member 9 first slides to the upper end 7 of the guide 4 and next lifts the sinker 2 off the ground. The line 25 is now pulling the sinker unit through the water and as the portion above the guide 4 offers more resistance due to the longer leverage and greater drag, the sinker unit next swings into sinker first position and the pulling movable member 9 consequently slides to the front end of the guide 4. Of course the wire-link 11 could be permanently and pivotally secured to the sinker unit at its center of gravity, the projecting sinker however would have a tendency to hook into weeds and other obstructions during the retrieve. In the illustrated form the wire link pulls the assembly at its front end and so reduces entanglement with weeds.

Modified form

A modified form of the same invention is illustrated in Figure 4 of the drawing. The main difference of this form of construction is that a tubular leader enclosure and leader directing means is detachable from the upper end of the slender intermediate body portion to expose a leader retaining means to facilitate attachment and detachment of the hook-leader thereto and therefrom. This modified form has the buoyant means incorporated in the movable leader enclosure and the intermediate body portion is formed by a wire instead of by a buoyant body.

The modified form has a slender generally straight rigid body 31 of wire or other suitable material. The lower end of the wire is embedded in a sinker 32 of lead or other sinking material. The lower end portion of the wire 31 is return bent at the leading end 33 of the assembly as illustrated to form a guide means 34 for a movable member and line-link 35. The end of the guide-wire 34 is secured back upon the intermediate wire portion at the upper end 36 of the sinker. One end of the movable line-link forms a loop 37 loosely encircling the guide-wire 34. A loop 38 at the other end of the line-link provides a line attaching means for a fishing line 39. The opposite and normal upper end 40 of the slender wire-body 31 forms a combined leader retainer for a wiry flexible hook-leader 41 and a keeper for a buoyant tubular member 42 of cork, foam plastic, or other suitable material. The upper inside portion of the tubular member provides a cavity which forms a combined leader passageway 43 and a directional leader support 51. The passageway of the tubular member is adapted to receive and enclose the return bent leader retainer 40 and the connective end of the hook-leader including a leader-loop 49. A tubular insert 44 is permanently secured into the passageway of the buoyant body 42 at the lower end thereof. The upper end of this insert forms a shoulder 45 adapted to stop outside movement of the float 42 by contact with the almost circular loop 40 of the intermediate body portion 31. A return bent portion of the wire forms a resilient arm 46 having a transverse lock-shoulder 47 adapted to engage the adjacent lower end of the tubular member 42 and insert 44. The insert is thus retained between shoulders formed by the wire as illustrated and the insert in turn holds the tubular buoyant member in place. The protruding lock-shoulder 47 can be manually pressed toward the intermediate wire-body 31 that in turn aligns the lock-shoulder with the passageway 48 in the insert. As the passageway in the insert is bigger than the lock-shoulder, the float 42 can be pushed over the lock-shoulder and along the wire-body 31 toward the sinker. The leader retaining means 40 incorporated in the upper end of the wire-body is thus exposed and open to facilitate attachment and detachment of a looped end 49 of the hook-leader. The buoyancy of the buoyant member 42 is sufficient to hold the wire-body 31 in an approximately vertical position when the sinker rests on the bottom 50 of a body of water. When the buoyant body 42 is in the normal locked position as illustrated, then the retained leader portion emerging from the cavity 43 rests on the directional leader support 51 formed by the upper end of the tube-wall 52. The buoyancy of the tubular member cooperates with the leader support to direct the emerging leader portion upward for greater bottom 50 to hook 53 distance. The line-link 35 can slide freely along the guide 34 to locate at the trailing end thereof during casting when the inertia of the sinker pulls out the line 39. When the line pulls the assembly during retrieving, then the line-link is located at the leading end of the guide and sinker.

While I have described my invention in detail in the present preferred embodiments, it will be obvious to those skilled in the art that various changes and modifications may be made therein without departing from the spirit or scope thereof. I aim in the appended claims to cover all such modifications and changes.

What I claim is:

1. A bait raiser comprising a slender generally straight tube having a sinker secured to the normal lower end thereof, the opposite and normal top-end portion of said tube forming a leader enclosure adapted to have the leading end of a hook-leader inserted therein, a partition seal in said tube forming the bottom of said leader enclosure, leader retaining means adapted to have the loop-end of a hook-leader secured thereto associated with the bottom portion of said leader enclosure, the intermediate portion of said tube having spaced partition seals watertightly secured therein in such a manner as to form a buoyant air chamber, line attaching means disposed on the sinker end of said bait raiser including an eyelet for a fishing line, the buoyancy of said air chamber being adequate to hold said tube in an upright position above said sinker when the same is at rest on the bottom of a body of still water.

2. A bait raiser as set forth in claim 1 wherein the wall of the tube has an aperture therethrough communicating with the leader enclosure, said bottom of the leader enclosure being inclined and forming a leader deflector-face slanting in the direction of said aperture, and wherein said leader retaining means includes a split ring embracing said tube and extending across said aperture and into said leader enclosure for attaching the looped end of the hook-leader thereto.

3. A bait raiser comprising a slender generally straight tube, a sinker secured to the normal lower end of said tube, the opposite and normal top-end portion of said tube forming a leader enclosure adapted to have the leading end of a hook-leader inserted therein, a leader retaining means adapted to have said leading end of the hook-leader secured thereto associated with said leader enclosure, a line attaching means disposed on said bait raiser, the intermediate portion of said tube having spaced partition seals arranged therein in such a manner as to form a buoyant air chamber, the buoyancy of said air chamber being sufficient to hold said tube in an upright position above said sinker when the latter is at rest on the bottom of a body of water.

4. A bait raiser as set forth in claim 3 wherein the wall of the tube has an aperture therethrough communicating with the leader enclosure, and wherein a portion of said leader retaining means extends across said aperture, the leading end of the hook-leader in the leader enclosure has a looped end, and said portion of the leader retaining means is adapted for insertion in said looped end of the hook-leader to retain the latter.

5. A bait raiser comprising a slender generally straight rigid body, a sinker on one end of said body, line attaching means on the sinker end of said bait raiser, a hook-leader attaching means on the end of said body opposite to that having said sinker, said body having a tubular portion at the opposite end thereof, and partition seals in said tubular portion in spaced relation to one another, said seals cooperating with said tubular portion to provide at least one buoyant air chamber to hold said body in an upright position in a body of water with said sinker end resting on the bottom of the body of water.

6. A bait raiser comprising a slender generally straight rigid body, a sinker secured to the normal lower end of said body, a line attaching means on the sinker end of the bait raiser, a buoyant tubular member spaced from said sinker and normally secured to the upper end of said body, said tubular member having sufficient buoyancy to hold said body in approximately vertical alignment when the bait raiser is at rest on the bottom of a body of water, the inside of a portion of said tubular member forming a leader enclosure opening at the upper end thereof, said leader enclosure being adapted to have the connective end-portion of a wiry hook-leader inserted therein, a leader retaining means associated with said leader enclosure, and leader directing means formed by a wall portion of said leader enclosure, said wall portion being adapted to support the emerging retained leader portion to direct the same upward with the cooperation of said buoyant means.

7. A a bait raiser as set forth in claim 6 wherein said leader retaining means is incorporated in the upper end of said body and normally is enclosed within said tubular member, and wherein said tubular member is detachable from said upper end of the body to expose said leader retaining means to facilitate attachment of the hook-leader thereto.

8. A bait raiser comprising a slender generally straight rigid body, a sinker secured to the normal lower end of said body, a tubular member normally secured to the upper end of said body, a line attaching means on the sinker end of the bait raiser, the inside of a portion of said tubular member forming a leader enclosure opening at the upper end thereof, said leader enclosure being adapted to have the connective end portion of a wiry hook-leader inserted therein, a leader retaining means associated with said leader enclosure, a buoyant means, said buoyant means being spaced from said sinker and embodied in the upper portion of said body, the buoyancy of said buoyant means being sufficient to hold said body in approximately vertical alignment above the sinker when the latter is at rest on the bottom of a body of water, and leader directing means formed by a wall portion of said leader enclosure being adapted to direct the emerging retained leader portion upward.

9. A bait raiser comprising a sinker, a tubular leader enclosure, a slender generally straight rigid body having said sinker secured to the normal lower end thereof, a line attaching means on the sinker end of the bait raiser, said leader enclosure being disposed on the opposite and normal upper end of said body and opening at the normal top end of the bait raiser, said tubular leader enclosure extending in the general direction of said sinker and being adapted to have the connective end portion of a wiry hook-leader inserted therein, a leader retaining means associated with said leader enclosure, said body having a buoyant means embodied therein at a point spaced from the sinker, the buoyancy of said body being adequate to hold itself in an approximately vertical position above said sinker when the latter is at rest on the bottom of a body of water, and leader directing means formed by the wall of said leader enclosure being adapted to direct the emerging retained leader portion upward with the cooperation of said buoyant means.

10. A bait raiser having a slender generally straight rigid body, a sinker secured to one end of said body, the body end-portion opposite said sinker being buoyant and acting as a trailing vane during casting, a leader retaining means provided on said trailing end-portion of the body, a movable member forming a line-link adapted to have a fishing line secured thereto, and guide means for said movable member disposed on the sinker end of the bait raiser, said guide means being adapted to guide the movable member from a position at the leading end of the bait raiser to a position adjacent to the center of gravity of the bait raiser when the latter starts to pull the fishing line during casting.

11. A bait raiser comprising a buoyant body and a sinker, connective means rigidly securing said sinker to one end of said buoyant body, a line attaching means on the sinker end of the bait raiser, the buoyancy of said buoyant body being sufficient to hold the latter above said sinker when the bait raiser is at rest on the bottom of a body of water, a leader enclosure formed within said bait raiser opening to the outside surface of the latter's normal top-end opposite said sinker, said leader enclosure extending from said open top-end in the general direction of said sinker and being adapted to have the connective end portion of a wiry hook-leader inserted therein with the remainder of the hook-leader extending beyond said top-end and carrying a fish-hook, a leader retaining means associated with said leader enclosure being adapted to have the connective end of the hook-leader in said leader enclosure attached thereto and detached therefrom, and a directional leader support for said remainder of the wiry hook-leader formed by said open end of the leader enclosure and by the normal top-end of said bait raiser, said directional leader support being adapted to direct the emerging leader portion upward.

12. A bait raiser comprising a buoyant body and a sinker, connective means rigidly securing said sinker to one end of said buoyant body, a line attaching means on the sinker end of the bait raiser, the buoyancy of said buoyant body being sufficient to hold the latter above said sinker when the bait raiser is at rest on the bottom of a body of water, a leader retaining means associated with said buoyant body being adapted to have the connective end of a wiry hook-leader attached thereto and detached therefrom, and a directional leader support for the remainder of the wiry hook-leader formed by the normal top-end of said buoyant body opposite said sinker, said directional leader support being adapted to direct said remainder of the hook-leader upward.

13. A bait raiser comprising a generally straight rigid slender body, a sinker incorporated in the normal lower part of said body, buoyant means incorporated in the normal upper part of said body, the buoyancy of said buoyant means being sufficient to hold the body in upright position when the bait raiser is at rest on the bottom of a body of water, an attaching means for a fishing line on the sinker end of the bait raiser, and a leader directing means including a tubular member on the normal top end of said body, the inside of said tubular member forming a comparatively long narrow leader enclosure positioned in general alignment with said body and being open on the top end thereof for insertion of the connective end portion of a wiry flexible hook-leader, and a leader retaining means associated with said leader enclosure and adapted for attachment of the connective end of the hook-leader in the leader enclosure thereto, said buoyant means cooperating with the leader directing means to direct the retained emerging leader portion upward.

14. A bait raiser as set forth in claim 13 wherein the normal lower end of a leader enclosure opens through the surface of the body, and wherein a portion of said leader retaining means extends across said open lower end of the leader enclosure, the connective end of said hook-leader in the leader enclosure having a looped end, and said portion of the leader retaining means being adapted for insertion in said looped end of the hook-leader to retain the latter.

15. A bait raiser as set forth in claim 13 wherein said leader retaining means is incorporated in the upper end of said body and normally is enclosed within said tubular member, and wherein said tubular member is detachable from said upper end of the body to expose said leader retaining means to facilitate attachment of the hook-leader thereto.

16. A bait raiser comprising a buoyant body, a sinker secured to one end of said buoyant body, an attaching means for a fishing line provided on the bait raiser, the buoyancy of said buoyant body being sufficient to hold the latter above said sinker when the bait raiser is at rest on the bottom of a body of water, a leader enclosure formed by a cavity in the normal upper end portion of the buoyant body opposite the sinker, said leader enclosure being adapted to receive the connective end portion of a wiry flexible hook-leader, a leader retaining means associated with the bottom of said leader enclosure, said leader retaining means being adapted to have the connective end of said hook-leader attached thereto and detached therefrom, and a directional leader support for the remainder of the wiry hook-leader formed by the normal top-end of said buoyant body opposite the sinker, said directional leader support being adapted to direct said remainder of the hook-leader upward.

17. A bait raiser comprising a buoyant body, a sinker secured to one end of said buoyant body, an attaching means for a fishing line provided on the bait raiser, the buoyancy of said buoyant body being sufficient to hold the latter above said sinker when the bait raiser is at rest on the bottom of a body of water, a leader retaining means associated with said buoyant body being adapted to have the connective end of a wiry hook-leader attached thereto and detached therefrom, and a directional leader support for the remainder of the wiry hook-leader formed by the normal top-end of said buoyant body opposite said sinker, said directional leader support being adapted to direct said remainder of the hook-leader upward.

References Cited in the file of this patent
UNITED STATES PATENTS

| Number | Name | Date |
| --- | --- | --- |
| 285,075 | Rix | Sept. 18, 1883 |
| 1,589,522 | Felix | June 22, 1926 |
| 1,652,858 | Hahn | Dec. 13, 1927 |
| 1,755,159 | Cowdery et al. | Apr. 15, 1930 |
| 2,014,517 | Beregow | Sept. 17, 1935 |
| 2,109,693 | Gaines | Mar. 1, 1938 |
| 2,157,003 | Mussina | May 2, 1939 |
| 2,157,819 | Eckert | May 9, 1939 |
| 2,275,076 | Haynes | Mar. 3, 1942 |
| 2,443,946 | Bozorth | June 22, 1948 |